Figure 1:
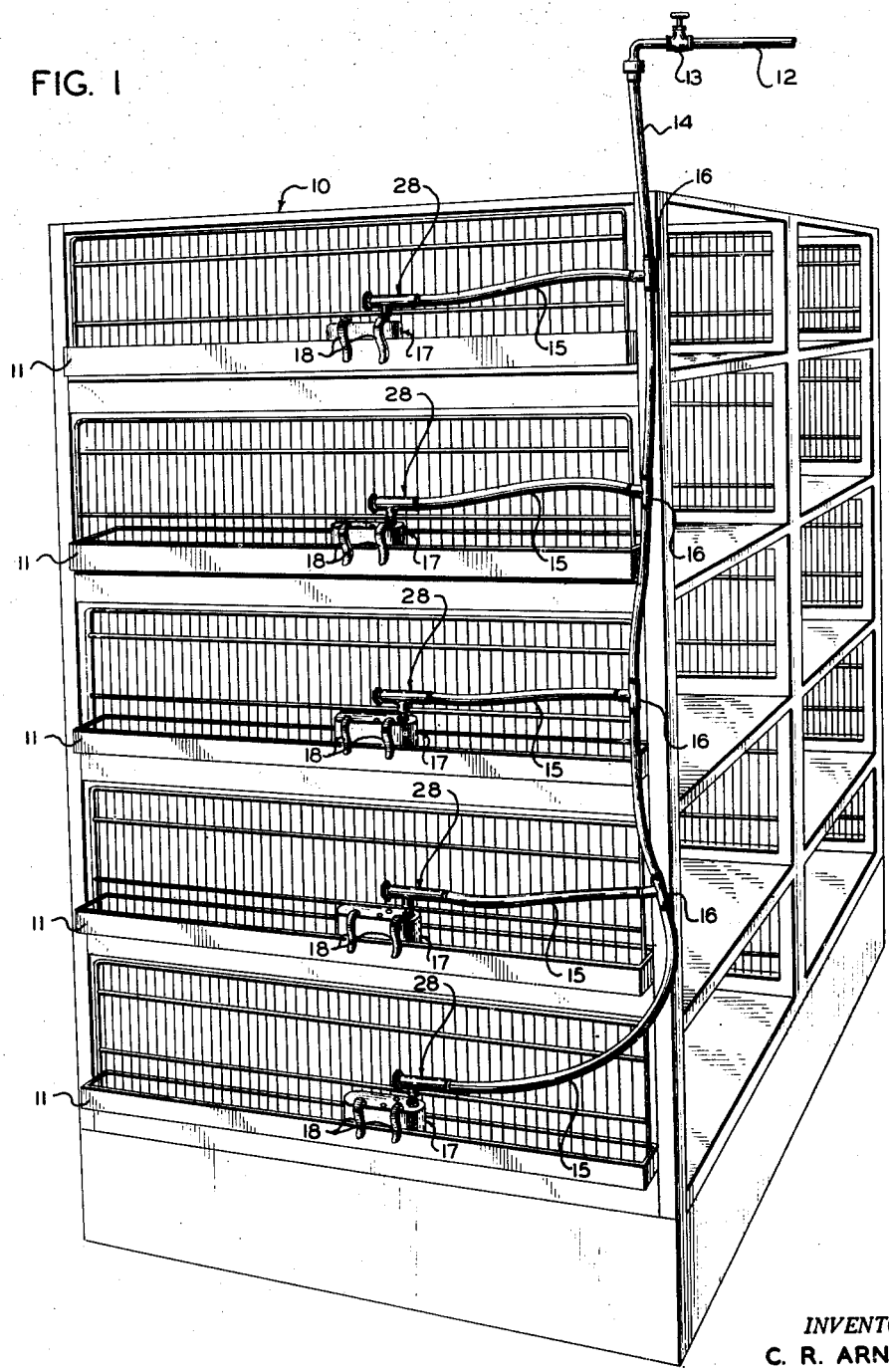

Aug. 12, 1952     C. R. ARNOLD     2,606,572
LIQUID LEVEL CONTROL

Filed Feb. 10, 1949     2 SHEETS—SHEET 1

INVENTOR.
C. R. ARNOLD
BY
*A. Yates Dowell*
ATTORNEY

Aug. 12, 1952     C. R. ARNOLD     2,606,572
LIQUID LEVEL CONTROL
Filed Feb. 10, 1949     2 SHEETS—SHEET 2
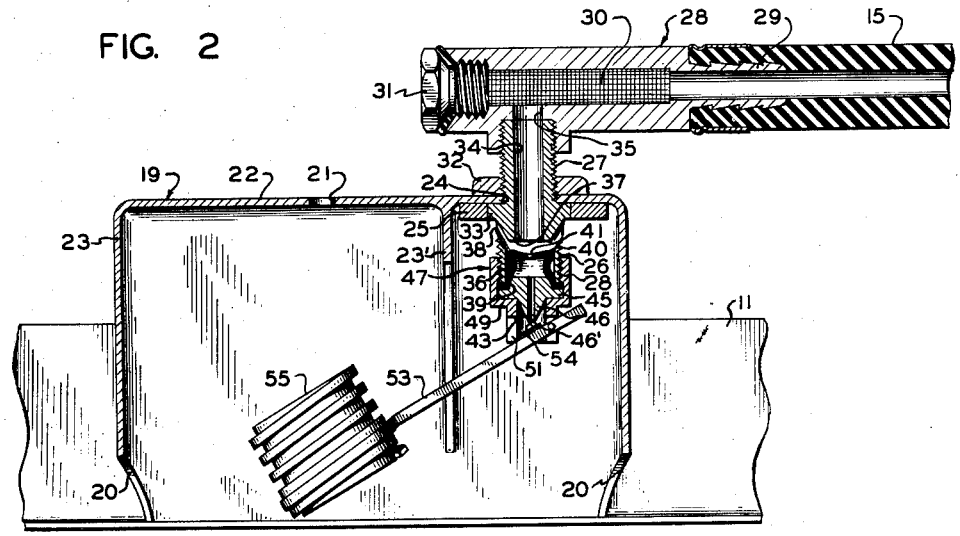
FIG. 2
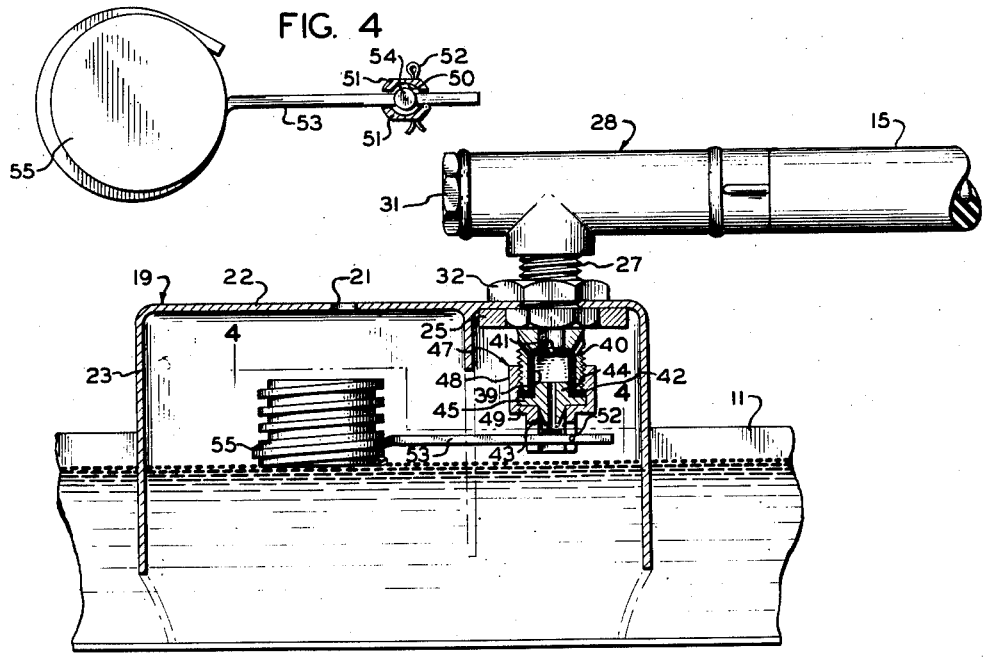
FIG. 4
FIG. 3
INVENTOR.
C. R. ARNOLD
BY
ATTORNEY Patented Aug. 12, 1952

2,606,572

UNITED STATES PATENT OFFICE 2,606,572

LIQUID LEVEL CONTROL

Charles Richard Arnold, New Richmond, Wis., assignor, by mesne assignments, to Harris Trust and Savings Bank and W. H. Milsted as trustees Application February 10, 1949, Serial No. 75,651

6 Claims. (Cl. 137—414)

This invention relates to improvements on a liquid level control device of the general type described in my co-pending application Serial No. 730,087, filed February 21, 1947, and now abandoned.

Although devices of this general character have been in use for many years, the need for a simple and efficient device has not been met. Other devices have employed apparatus whose operating principles are similar to the valve of the present invention, but these have been expensive, complex, bulkier, and less satisfactory in operation.

It is, therefore, an object of the present invention to provide an improved liquid level control device which is simple and inexpensive and which will operate in an accurate and sensitive manner.

Another object of the invention is the provision of a large capacity liquid level control device which may be employed with a supply of water containing particles of solid material and not be affected by such particles and wherein the main valve is controlled by a sensitive pilot valve.

A further object of the invention is the provision of a compact liquid level controlling unit which may be supplied from a main supply line along with others of the same type to provide a controlled level of water for a plurality of receptacles.

A further object of the invention is the provision of an easily adjustable float member for a liquid level control device.

Other objects and advantages of the invention will be apparent from the following description taken in conjunction with the accompanying drawings, wherein:

Fig. 1 is a perspective illustrating the use of a plurality of liquid level controlling devices in accordance with the present invention;

Fig. 2, a vertical section through a liquid level controlling device shown with the valve in open position;

Fig. 3, a partial vertical section through the device of Fig. 2 showing the valve in closed position; and Fig. 4, a section on the line 4—4 of Fig. 3.

Fig. 1 illustrates the use of the control device of the present invention. A compartmented cage or inclosure 10 is provided, having a receptacle 11 for containing a supply of water for the occupants of the inclosures, such as chickens or other animals. In order to supply water to each of the receptacles 11, a supply line 12 having a valve 13 is connected to a main supply line 14 which supplies each of the branch lines 15 leading to the receptacles 11. A T fitting 15 may be used to connect the main line 14 to each of the branches. For maintaining the desired level of liquid in each of the receptacles, a control device 17 is attached by spring members 18 to each of the receptacles 11.

The control device consists of an inverted cup or housing 19 whose edges are provided with cut-out portions or openings 20, in order that water may be freely passed from within said cup to the outside thereof, and so that the level of liquid within the cup will be the same as that without the cup. A shield 23' is positioned in the cup to serve as a baffle for the water flowing out of the valve. The cup is also provided with one or more apertures 21 which may be formed in the cup in its bottom 22, or on a side 23, provided that the apertures are positioned so that when the cup is placed in operating position as shown in the drawings, the apertures will at all times remain above the liquid level. These apertures permit air trapped within the cup to escape when the water level rises therein and also permit air to enter in the event that the pressure in the supply line drops below that within the cup, in order to prevent siphoning out of the liquid.

The cup also has a bore 24 in its bottom wall with a boss 25 adjacent the bore.

A valve body 26 is connected to the cup and seated in said bore. The valve body has a reduced threaded extension 27 at one end, and an enlarged threaded extension 28 at the other separated by a flange 33. Attached to the reduced extension is one branch of a T coupling 29 through which liquid is supplied to the valve. The T coupling includes a serrated extension 29 for connecting the coupling to the branch hose 15.

A strainer 30, which is preferably of fine copper wire or the like is attached to a plug 31 which closes one branch of the coupling in order that particles of solid matter will be kept from passing into the valve.

The valve body 26 is securely attached to the cup 19 by means of a nut 32 in threaded engagement with the extension 27, the valve being positioned also by the cooperating surfaces of its flange 33 and those of the boss 25. If desired the engaging surfaces of the boss 25 and flange 33 may be of non-circular formation in order to prevent relative rotation therebetween.

A bore 34 within the reduced extension 27 connects with a bore 35 of the T coupling 29, said bore 34 also being in communication with a larger bore 36 within said enlarged extension 28. Projecting into said larger bore and defining a portion of the smaller bore is an annular main valve seat 37. The enlarged extension 28 is provided with a plurality of circumferentially spaced inclined openings 38 through which water is adapted to pass. The openings 38 in the wall of said extension are positioned so that they substantially surround the valve seat 37.

Positioned within the bore 36 is a cup shaped resilient diaphragm 39 having a bottom wall 40 which provides a valve member for the valve seat 37, and has an aperture 41 through which water may pass. The inclination of the openings 38 permits a given movement of the bottom wall to uncover an opening of larger cross-section than if the openings were at substantially right angles to the axis of the bore. Furthermore, with this arrangement, the water is not directed at the water already in the bowl thus lessening its agitation by water flowing from the valve.

The diaphragm is provided at its open end with a flange 42 for engagement with the free end of said enlarged extension.

A closure member 43 has a cylindrical portion 44 seated within the open end of the diaphragm, and a flange 45 for engagement with the flange 42 of the diaphragm. The member 43 is also provided with a conical portion 46 and has a pilot bore or opening 46' therethrough of larger dimension than that of the aperture 41 in said diaphragm.

For maintaining the diaphragm and closure member in position, a cap 47 is secured in threaded engagement with the enlarged extension of the valve member. This cap has a substantially cylindrical portion 48 whose inner surface is threaded for engagement with the threaded extension and whose end wall 49 abuts the flange 45 of the closure member 43, thus retaining the closure member and the diaphragm in position. The cap is also provided with an aperture 50 in its closure end for receiving the conical portion 46 of said closure member. Spaced arms 51 which may be integral with the cap, have pins 52 passing therethrough for pivotally supporting a float arm 53. A pilot valve member 54 is supported by said float arm between the spaced members 51 in substantial alignment with the aperture 50 and is adapted to engage conical portion 46, the end face of which forms a valve seat for the pilot opening. Although the cap 47 is described as separable from the closure member 43, obviously these may be integral if desired.

The free end of the float arm is formed into a spiral coil of approximately one revolution and is in threaded engagement with a float 55. The pitch of the coil may be approximately one-third its diameter in order that adjustment of the float may be quickly made, although this relationship may be varied as desired. The float may be of various buoyant materials, although a preferred substance is the plastic "Styrofoam," an expanded polystyrene, manufactured by the Dow Chemical Corporation. In order to adjust the position of the float relative to the float arm, it is merely necessary to rotate the float relative to the arm.

The operation of the device is substantially as follows: water under pressure flows through the hose 15 to the inlet bore 34 of the extension 27, passing through the strainer 30 of the T coupling 28 in order that particles of solid matter will be filtered out before the water enters the valve. Assuming that the receptacle or trough 11 is substantially empty as shown in Fig. 2, the pressure of the water will cause the diaphragm 39 to assume a position like that shown in Fig. 2 thus unseating the diaphragm from the main valve seat 37. This distortion is caused by reason of the fact that the pilot opening 46 passes water more rapidly from the interior of the diaphragm, then the diaphragm opening 41 admits water thereto. As a result pressure on the exterior end wall of the diaphragm is greater than that on the interior and the diaphragm is consequently unseated. During this phase of the operation therefore it is apparent that a large flow of water may pass out of the openings 38 which are uncovered by the unseating of the diaphragm, a smaller amount of water likewise passing out of the pilot opening of the valve.

When the level of the water has reached a predetermined height as shown in Fig. 3, the float acting on the float arm causes the valve member 54 to contact the valve seat 46 thus closing the pilot opening. When this occurs water continues entering the diaphragm through the aperture 41 until the pressure within the diaphragm is substantially the same as that without. As the pressure equalizes, the diaphragm returns to its normal shape and when equalization has taken place the diaphragm is in its normal position as shown in Fig. 3 whereby its end wall engages the valve seat 37 and prevents further flow through the openings 38 of the valve. The gradual shut-off of the flow reduces the shock to the supply line which would otherwise occur, thus eliminating the phenomenon known as water hammer.

When the supply of water drops below the predetermined desired level the valve member 54 is unseated to permit a flow through the pilot opening, thus causing the differential pressure to unseat the diaphragm from engagement with the valve seat 37 to permit water to flow into the receptacle.

It is apparent that the invention includes a simple, compact, inexpensive and sensitive liquid level control device whose operation may be quickly and easily adjusted.

It will be obvious to those skilled in the art that various changes may be made in the invention without departing from the spirit and scope thereof and therefore the invention is not limited by that which is shown in the drawings and described in the specification but only as indicated in the appended claims.

What is claimed is:

1. Liquid level controlling apparatus comprising a liquid receptacle; an inverted cup within said receptacle, the edges of said cup being provided with openings for the passage of water from within said cup to the outside thereof when said cup is within said receptacle, said cup having a bore and one or more apertures; a boss associated with said bore; a valve member connected to said cup and passing through said bore, said valve member comprising a fitting having a reduced threaded extension at one end and an enlarged threaded extension at the other end, and a flange between said extensions, said flange being received in a complementary recess in said boss to prevent relative rotation of said valve member, said valve member having a smaller bore within said reduced extension in communication with a larger bore within said enlarged extension, a valve seat extending into said larger bore and defining a portion of the smaller bore, said enlarged extension having a plurality of circumferentially spaced inclined openings in the wall thereof and substantially surrounding said projection; a cup shaped resilient diaphragm positioned within said enlarged extension, said diaphragm having an end wall with an aperture therein and adapted to abut the projection extending within said larger bore, the edge of said resilient diaphragm having a flange for engagement with the free end of said enlarged extension; a closure member for said valve member and comprising a cylindrical portion seated within said diaphragm, a flange for engagement with said diaphragm flange and a conical portion, said closure member having a pilot opening therethrough of larger dimension than that of the aperture in the end wall of said diaphragm; a cap in threaded engagement with said enlarged extension and abutting the flange of said closure member to maintain said closure member and said diaphragm in operative position relative to said enlarged extension, said cap having an aperture for receiving the conical portion of said closure member; a valve member movably received within the aperture of said cap for closing said pilot opening; a float arm for actuating said valve member and pivotally attached to said cap, the free end of said float arm being in the form of a coil; and a light weight plastic float member in threaded engagement with said arm whereby the position of said float member relative to said float arm may be adjusted.

2. Liquid level controlling apparatus comprising a liquid receptacle; an inverted cup within said receptacle, the edges of said cup being provided with openings for the passage of water from within said cup to the outside thereof when said cup is within said receptacle, said cup having a bore; a valve member connected to said cup and passing through said bore, said valve member comprising a fitting having a reduced threaded extension at one end and an enlarged threaded extension at the other end, said valve member having a smaller bore within said reduced extension in communication with a larger bore within said enlarged extension, a valve seat extending into said larger bore and defining a portion of the smaller bore, said enlarged extension having a plurality of circumferentially spaced inclined openings in the wall thereof and substantially surrounding said projection; a cup shaped resilient diaphragm positioned within said enlarged extension, said diaphragm having an end wall with an aperture therein and adapted to abut the projection extending within said larger bore, the edge of said resilient diaphragm having a flange for engagement with the free end of said enlarged extension; a closure member for said valve member and comprising a cylindrical portion seated within said diaphragm, a flange for engagement with said diaphragm flange and a conical portion, said closure member having a pilot opening therethrough of larger dimension than that of the aperture in the end wall of said diaphragm; a cap in threaded engagement with said enlarged extension and abutting the flange of said closure member to maintain said closure member and said diaphragm in operative position relative to said enlarged extension, said cap having an aperture for receiving the conical portion of said closure member; a valve member movably received within the aperture of said cap for closing said pilot opening; a float arm for actuating said valve member and pivotally attached to said cap, the free end of said float arm being in the form of a coil; and a light weight plastic float member in threaded engagement with said arm whereby the position of said float member relative to said float arm may be adjusted.

3. Liquid level controlling apparatus comprising a liquid receptacle; an inverted cup within said receptacle, the edges of said cup being provided with openings for the passage of water from within said cup to the outside thereof when said cup is within said receptacle, said cup having a bore; a valve member connected to said cup and passing through said bore, said valve member comprising a fitting having a reduced threaded extension at one end and an enlarged threaded extension at the other end, said valve member having a smaller bore within said reduced extension in communication with a larger bore within said enlarged extension, a valve seat extending into said larger bore and defining a portion of the smaller bore, said enlarged extension having one or more openings in the wall thereof; a cup shaped resilient diaphragm positioned within said enlarged extension, said diaphragm having an end wall with an aperture therein and adapted to abut the projection extending within said larger bore, the edge of said resilient diaphragm having a flange for engagement with the free end of said enlarged extension; a closure member for said valve member and comprising a cylindrical portion seated within said diaphragm, a flange for engagement with said diaphragm flange and a conical portion, said closure member having a pilot opening therethrough of larger dimension than that of the aperture in the end wall of said diaphragm; a cap in threaded engagement with said enlarged extension and abutting the flange of said closure member to maintain said closure member and said diaphragm in operative position relative to said enlarged extension, said cap having an aperture for receiving the conical portion of said closure member; a valve member movably received within the aperture of said cap for closing said pilot opening; a float arm for actuating said valve member and pivotally attached to said cap, the free end of said float arm being in the form of a coil; and a light weight plastic float member in threaded engagement with said arm whereby the position of said float member relative to said float arm may be adjusted.

4. Liquid level controlling apparatus comprising a liquid receptacle; an inverted cup within said receptacle, the edges of said cup being provided with openings for the passage of water from within said cup to the outside thereof when said cup is within said receptacle, said cup having a bore; a valve member connected to said cup and passing through said bore, said valve member comprising a fitting having a reduced threaded extension at one end and an enlarged threaded extension at the other end, said valve member having a smaller bore within said reduced extension in communication with a larger bore within said enlarged extension, a valve seat extending into said larger bore and defining a portion of the smaller bore, said enlarged extension having one or more openings in the wall thereof; a cup shaped resilient diaphragm positioned within said enlarged extension, said diaphragm having an end wall with an aperture therein and adapted to abut the projection extending within said larger bore; a closure member for said valve member and comprising a cylindrical portion seated within said diaphragm, and a conical portion, said closure member having a pilot opening therethrough of larger dimension than that of the aperture in the end wall of said diaphragm; a cap to maintain said closure member and said diaphragm in operative position relative to said enlarged extension, said cap having an aperture for receiving the conical portion of said closure member; a valve member for closing said pilot opening; a float arm for actuating said valve member, the free end of said float arm being in the form of a coil; and a light weight plastic float member in threaded engagement with said arm whereby the position of said float member relative to said float arm may be adjusted.

5. Liquid level controlling apparatus comprising a liquid receptacle; an inverted cup within said receptacle, the edges of said cup being provided with openings for the passage of water from within said cup to the outside thereof when said cup is within said receptacle, said cup having a bore; a valve member connected to said cup and passing through said bore, said valve member comprising a fitting having a reduced threaded extension at one end and an enlarged threaded extension at the other end, said valve member having a smaller bore within said reduced extension in communication with a larger bore within said enlarged extension, a valve seat extending into said larger bore and defining a portion of the smaller bore, said enlarged extension having one or more openings in the wall thereof; a cup shaped resilient diaphragm positioned within said enlarged extension, said diaphragm having an end wall with an aperture therein and adapted to abut the projection extending within said larger bore; a closure member for said valve member and comprising a cylindrical portion seated within said diaphragm, and a conical portion, said closure member having a pilot opening therethrough of larger dimension than that of the aperture in the end wall of said diaphragm; a cap to maintain said closure member and said diaphragm in operative position relative to said enlarged extension, said cap having an aperture for receiving the conical portion of said closure member; a valve member for closing said pilot opening; and a float arm for actuating said valve member.

6. Liquid level responsive control apparatus for use in a receptacle, comprising a stand adapted to rest within the receptacle, and a valve member connected to said stand; said valve member comprising a fitting having connected bores one forming an inlet and one an outlet, a main valve seat for said inlet bore within said outlet bore, said outlet bore having a wall including main outlet means, a cup-shaped flexible member in said outlet bore and having an aperture at its closed end, said closed end being movable to and from said valve seat, closure means for the open end of said flexible member and having a bore forming a pilot opening of larger dimension than the aperture in said closed end, and means for closing the pilot opening for causing said flexible member to engage said valve seat, said means being responsive to the level of the liquid.

CHARLES RICHARD ARNOLD.

REFERENCES CITED

The following references are of record in the file of this patent:

UNITED STATES PATENTS

| Number | Name | Date |
|---|---|---|
| 595,061 | Gulland | Dec. 7, 1897 |
| 848,739 | Gut | Apr. 7, 1907 |
| 894,734 | Haas | July 28, 1908 |
| 1,160,441 | Packer | Nov. 16, 1915 |
| 1,302,538 | Gulick | May 6, 1919 |
| 1,878,947 | Luff | Sept. 20, 1932 |
| 1,980,430 | Pearse | Nov. 13, 1934 |
| 2,136,707 | Owens | Nov. 15, 1938 |
| 2,491,521 | Samiran | Dec. 20, 1949 |

FOREIGN PATENTS

| Number | Country | Date |
|---|---|---|
| 595,061 | Sweden | Dec. 7, 1897 |